US012074951B2

(12) United States Patent
Bhanushali et al.

(10) Patent No.: US 12,074,951 B2
(45) Date of Patent: Aug. 27, 2024

(54) ASSIGNING A MONEY SIGN TO A USER

(71) Applicant: 1 FINANCE PRIVATE LIMITED, Gujarat (IN)

(72) Inventors: Keval Bhanushali, Mumbai (IN); Animesh Hardia, Mumbai (IN)

(73) Assignee: 1 FINANCE PRIVATE LIMITED, Gujarat (IN)

( * ) Notice: Subject to any disclaimer, the term of this patent is extended or adjusted under 35 U.S.C. 154(b) by 0 days.

(21) Appl. No.: 18/620,456

(22) Filed: Mar. 28, 2024

(65) Prior Publication Data

US 2024/0244115 A1 Jul. 18, 2024

Related U.S. Application Data

(63) Continuation of application No. PCT/IN2023/050816, filed on Aug. 29, 2023.

(30) Foreign Application Priority Data

Aug. 30, 2022 (IN) .............................. 202221049348

(51) Int. Cl.
*G06F 15/16* (2006.01)
*H04L 67/306* (2022.01)

(52) U.S. Cl.
CPC ................... *H04L 67/306* (2013.01)

(58) Field of Classification Search
CPC .................................................... H04L 67/306
USPC ........................................................ 709/203
See application file for complete search history.

(56) References Cited

U.S. PATENT DOCUMENTS

| 11,228,810 | B1 * | 1/2022 | Arazi | H04N 21/251 |
| 2020/0380597 | A1 * | 12/2020 | Furbish | G06Q 40/02 |
| 2023/0334590 | A1 * | 10/2023 | Chehrazi | G06Q 30/0203 |
| 2023/0370459 | A1 * | 11/2023 | De Lazzari | G06Q 50/01 |
| 2023/0421644 | A1 * | 12/2023 | Kasi | H04L 67/306 |
| 2024/0028353 | A1 * | 1/2024 | Elliott | H04L 67/306 |

OTHER PUBLICATIONS

Angelica Willis et al., Key Phrase Extraction for Generating Educational Question-Answer Pairs (2019).
Daniel Garabato et al., AI-Based User Authentication Reinforcement By Continuous Extraction of Behavioral Interaction Features ; Neural Computing and Applications (2022) 34:11691-11705.

* cited by examiner

*Primary Examiner* — Alan S Chou
(74) *Attorney, Agent, or Firm* — Shumaker, Loop & Kendrick, LLP

(57) ABSTRACT

A system and a method for assigning a money sign to a user. The system receives a request to identify a money sign for a user. Further, the system renders a set of questions. Furthermore, the system receives a set of answers from the user. Subsequently, the system extracts a key component from the set of answers received from the user. Further, the system scores the key component for the set of answers based on a scoring matrix and deep learning algorithms. Subsequently, the system compares a user score for each of the key component against a facet score for each of a set of predefined money signs. Further, the system generates a match score for each of a set of predefined money signs. Finally, the system assigns the money sign identified with a maximum match score to the user.

10 Claims, 7 Drawing Sheets

ASSIGNING A MONEY SIGN TO A USER

PRIORITY INFORMATION

The present application claim priority from International Application Number PCT/IN2023/050816 dated Aug. 29, 2023, which in turn takes priority from Indian Application Number 202221049348 dated Aug. 30, 2022.

TECHNICAL FIELD

The present subject matter described herein, in general, relates to a system and a method for assigning a money sign to a user.

BACKGROUND

Generally, financial literacy and rational judgement are known to have significant impact on an individual's life. Further, the rate of financial literacy is extremely low even in the developed nations. Recent pandemic demonstrated the importance of financial planning for all classes of society. Often, peers, colleagues, bank managers, and chartered accountants, are approached for gaining insights about investments, loans and all other financial requirements. However, such advisory is provided based on one's personal judgement without regard to the individual's personality traits, psychological preferences, strengths, and weaknesses. Also, typically financial advisors follow a one-size-fits-all approach where, the most popular or most recent investment options are provided as a blanket solution for any financial planning requirement. Sometimes, the advisory provided by a human is bound to be biased, intentional, and irrational. In some instances, the biased advisory may not benefit the individual and may also lead to financial losses. Apart from these problems, an individual may not be able to securely communicate and share personal financial information to another individual. Consequently, the financial advice given without a complete understanding of the individual's current financial status is bound to be short-sighted, unreliable and most likely inaccurate. The conventional financial advisory approaches lack clarity, reasoning, and trustworthy solutions. Therefore, there is a need for unbiased, reasonable, and rational financial solutions that are tailored to an individual's personality and personal preferences.

SUMMARY

Before the present system(s) and method(s), are described, it is to be understood that this application is not limited to the particular system(s), and methodologies described, as there can be multiple possible embodiments which are not expressly illustrated in the present disclosures. It is also to be understood that the terminology used in the description is for the purpose of describing the particular implementations or versions or embodiments only and is not intended to limit the scope of the present application. This summary is provided to introduce aspects related to a system and a method for assigning a money sign to a user. This summary is not intended to identify essential features of the claimed subject matter nor is it intended for use in determining or limiting the scope of the claimed subject matter.

In one implementation, a method for assigning a money sign to a user is disclosed. Initially, a request to identify a money sign may be received from a user upon enrolling on an interface of a system through a selection of a user control. Further, a set of questions may be rendered on the interface for the user to answer. Furthermore, a set of answers may be received from the user through the interface. Subsequently, a key component may be extracted for each of the set of answers received from the user based on a machine learning model. It may be noted that the key component is correlated to a set of facets. Further, the key component for the set of answers may be scored based on a scoring matrix and deep learning algorithms. Subsequently, a user score for each of the key component may be compared against a facet score for each of a set of predefined money signs. The money signs may be understood to represent a certain psychological profile and a financial personality. Furthermore, a match score may be generated for each of the predefined money signs upon comparing the user score and the facet score. Finally, the money sign identified with a maximum match score may be assigned to the user.

In another implementation, a non-transitory computer readable medium embodying a program executable in a computing device for assigning a money sign to a user is disclosed. The program may comprise a program code for receiving a request to identify a money sign from a user for enrolling on an interface of a system through a selection of a user control. Further, the program may comprise a program code for rendering a set of questions on the interface for the user to answer. Furthermore, the program may comprise a program code for receiving a set of answers from the user. It may be understood that the set of answers is received on the interface. Subsequently, the program may comprise a program code for extracting a key component from each of the set of answers received from the user based on a machine learning model. It may be noted that the key component is correlated to a set of facets. Further, the program may comprise a program code for scoring the key component for the set of answers based on a scoring matrix and deep learning algorithms. Subsequently, the program may comprise a program code for comparing a user score for each of the key component against a facet score for each of a set of predefined money signs. It may be understood that the predefined money sign represents a certain psychological profile, and a financial personality. Further, the program may comprise a program code for generating a match score for each of the set of predefined money signs. It may be understood that the predefined money sign represents a certain psychological profile and a financial personality. Finally, the program may comprise a program code for assigning the money sign identified with a maximum match score to the user.

BRIEF DESCRIPTION OF THE DRAWINGS

The foregoing detailed description of embodiments is better understood when read in conjunction with the appended drawings. For the purpose of illustrating of the present subject matter, an example of a construction of the present subject matter is provided as figures, however, the invention is not limited to the specific method and system for assigning a money sign to a user disclosed in the document and the figures.

The present subject matter is described in detail with reference to the accompanying figures. In the figures, the left-most digit(s) of a reference number identifies the figure in which the reference number first appears. The same numbers are used throughout the drawings to refer to various features of the present subject matter.

Figure 1:
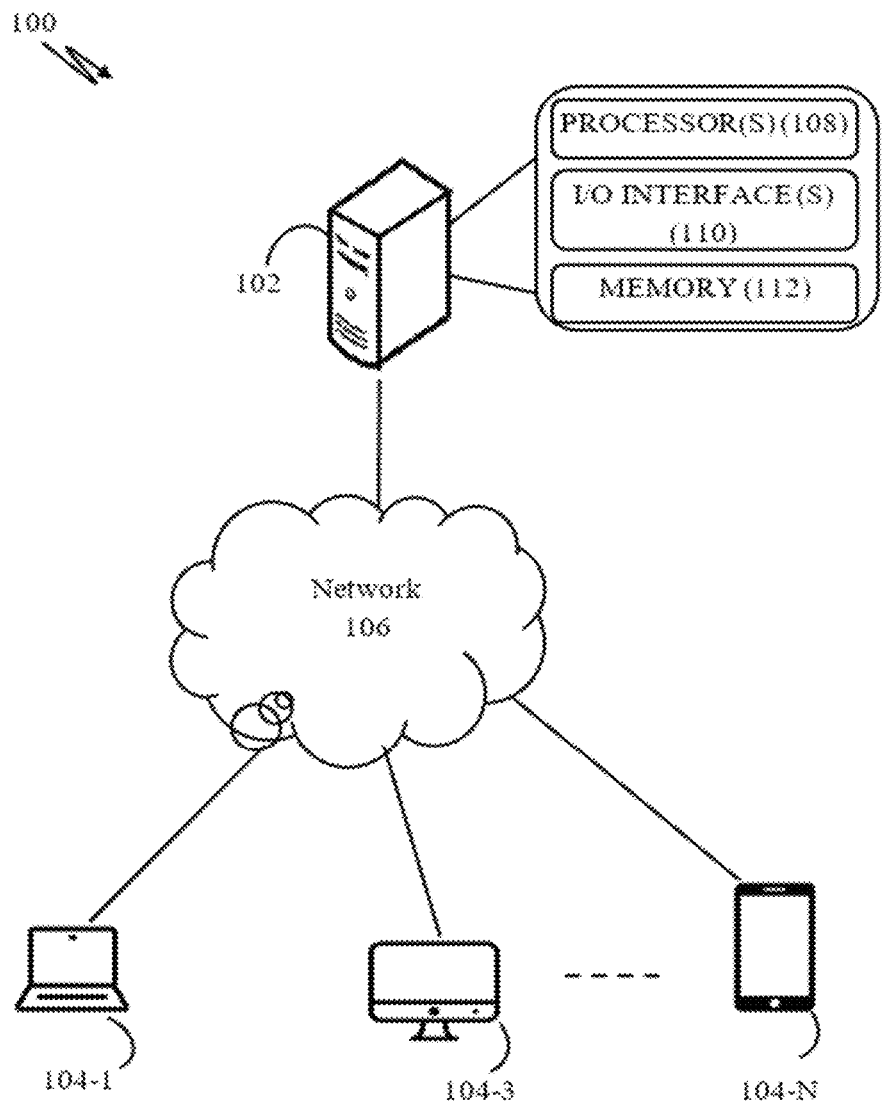
FIG. 1 illustrates a network implementation for assigning a money sign to a user, in accordance with an embodiment of the present subject matter.

The figure depicts an embodiment of the present disclosure for purposes of illustration only. One skilled in the art will readily recognize from the following discussion that alternative embodiments of the structures and methods illustrated herein may be employed without departing from the principles of the disclosure described herein.

DETAILED DESCRIPTION

Some embodiments of this disclosure, illustrating all its features, will now be discussed in detail. The words "receiving," "extracting," "computing," "assigning," and other forms thereof, are intended to be open ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise. Although any system and methods similar or equivalent to those described herein can be used in the practice or testing of embodiments of the present disclosure, the exemplary, system and methods are now described.

The disclosed embodiments are merely examples of the disclosure, which may be embodied in various forms. Various modifications to the embodiment will be readily apparent to those skilled in the art and the generic principles herein may be applied to other embodiments. However, one of ordinary skill in the art will readily recognize that the present disclosure is not intended to be limited to the embodiments described but is to be accorded the widest scope consistent with the principles and features described herein.

The present subject matter discloses a method and a system for assigning a money sign to a user. The term "money sign" as used herein refers to a symbolic representation of a unique set of personality traits and attributes. The aim of the invention is to automatically analyse a person's personality and psychological preferences using a scoring matrix and deep learning algorithms and determining a money sign for the user based on a set of facets corresponding to the user. Each of the set of predefined money signs is devised to represent a unique psychological profile, and financial personality. In other words, each money sign represents one particular psychological profile and financial personality. The system for implementing the method comprises at least a server, a communication network, a user interface having controls, and a processor.

The interface may be understood as an interactive platform between the system and the user. The system may help the user through the interface to identify the money sign and assign the money sign with a maximum match score to the user. The money sign with the maximum match score is indicative of the user's decision-making capabilities, risk taking abilities, behavioural traits and a financial personality.

Based on the identified money sign, the system may recommend customized, effective, and unbiased financial advice such as investment options, financial planning, asset management, tax planning etc.

Initially, the system receives a request to identify a money sign for a user on the interface of the system. It may be understood that the request may be received through a selection of a user control on the interface. Further, the system renders a set of questions on the interface for the user to answer. The set of questions is each mapped to a set of facets and are used to detect whether the user has a certain facet or not based on the answer received from the user.

Further more, the system receives a set of answers from the user on the interface. Upon receiving the answers, the system extracts a key component from each of the set of answers received from the user based on a machine learning model. The key component is then correlated to at least one facet of a set of facets using a rule-based mapping table.

Subsequently, the system scores the identified key components and the corresponding set of facets based on a scoring matrix and deep learning algorithms to generate a match score for each of a set of predefined money signs. Each of the predefined money signs represent a unique psychological profile, and financial personality. Finally, the system assigns the money sign identified with a maximum match score to the user.

Certain technical challenges exist for achieving the goal of assigning a money sign to a user in real time on a platform. One technical challenge includes automatically and accurately extracting a key component from the set of answers received from the user in real time. The key component is extracted for each answer of the set of answers and correlated to a set of facets. The solution presented by the embodiments disclosed herein to address the above challenge is a machine learning model for Natural Language Processing (NLP) techniques. It may be noted that use of one or more machine learning models is required to extract the key component from the set of answers received from the user.

The machine learning model may comprise a Term Frequency—Inverse Document Frequency (TF-IDF), a Support Vector Machine (SVM), a regression model, and a convolutional neural network (CNN). Another technical challenge includes automatically scoring the key component for each of the set of answers based on a scoring matrix.

The solution presented by the embodiments disclosed herein to address this challenge is generating the match score for each of a set of predefined money signs using deep learning algorithms. It may be understood that the deep learning algorithms, score the key component for each of the set of answers and assign a money sign identified with a maximum match score to the user. The solution presented by the embodiments disclosed in the present invention include scoring the key component for each of the set of answers for each money sign of the set of money signs. Another technical challenge includes assigning the money sign to the user correctly and accurately. The solution presented by the embodiments disclosed herein to address this challenge includes automatically assigning the money sign to the user based on a set of answers, such that the money sign with a maximum match score is assigned to the user. It may be noted that the set of money sign is predefined and each of the money sign is distinctive and validated using a test data for a test set of users.

Referring now to FIG. 1, a network implementation 100 of a system 102 for assigning a money sign to a user is disclosed. Initially, the system 102 receives a request to identify a money sign for a user. It may be noted that the one or more users may access the system 102 through one or more user devices 104-2, 104-3 . . . 104-N, collectively referred to as user devices 104, hereinafter, or applications residing on the user devices 104. The system 102 receives the request from a user from one or more user devices 104. Further, the system may also 102 receive response from a user using the user devices 104.

Although the present disclosure is explained considering that the system 102 is implemented on a server, it may be understood that the system 102 may be implemented in a variety of computing systems, such as a laptop computer, a desktop computer, a notebook, a workstation, a virtual environment, a mainframe computer, a server, a network server, and a cloud-based computing environment. It will be understood that the system 102 may be accessed by multiple users through one or more user devices 104-1, 104-2 . . . 104-N.

In one implementation, the system 102 may comprise the cloud-based computing environment in which the user may operate individual computing systems configured to execute remotely located applications. Examples of the user devices may include, but are not limited to, a portable computer, a personal digital assistant, a handheld device, and a workstation. The user devices 104 are communicatively coupled to the system 102 through a network 106.

In one implementation, the network 106 may be a wireless network, a wired network, or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

In one embodiment, the system 102 may include at least one processor 108, an input/output (I/O) interface 110, and a memory 112. The at least one processor 108 may be implemented as one or more microprocessors, microcomputers, microcontrollers, digital signal processors, Central Processing Units (CPUs), state machines, logic circuitries, and/or any devices that manipulate signals based on operational instructions. Among other capabilities, the at least one processor 108 is configured to fetch and execute computer-readable instructions stored in the memory 112.

The I/O interface 110 may include a variety of software and hardware interfaces, for example, a web interface, a graphical user interface, and the like. The I/O interface 110 may allow the system 102 to interact with the user directly or through the client devices 104. Further, the I/O interface 110 may enable the system 102 to communicate with other computing devices, such as web servers and external data servers (not shown). The I/O interface 110 can facilitate multiple communications within a wide variety of networks and protocol types, including wired networks, for example, LAN, cable, etc., and wireless networks, such as WLAN, cellular, or satellite. The I/O interface 110 may include one or more ports for connecting a number of devices to one another or to another server.

The memory 112 may include any computer-readable medium or computer program product known in the art including, for example, volatile memory, such as static random access memory (SRAM) and dynamic random access memory (DRAM), and/or non-volatile memory, such as read only memory (ROM), erasable programmable ROM, flash memories, hard disks, Solid State Disks (SSD), optical disks, and magnetic tapes. The memory 112 may include routines, programs, objects, components, data structures, etc., which perform particular tasks or implement particular abstract data types. The memory 112 may include programs or coded instructions that supplement applications and functions of the system 102. In one embodiment, the memory 112, amongst other things, serves as a repository for storing data processed, received, and generated by one or more of the programs or the coded instructions.

As there are various challenges observed in the existing art, the challenges necessitate the need to build the system 102 for assigning a money sign to a user in real time on a platform. At first, a user may use the user device 104 to access the system 102 via the I/O interface 110. The user may register the user devices 104 using the I/O interface 110 in order to use the system 102. In one aspect, the user may access the I/O interface 110 of the system 102. The detailed functioning of the system 102 is described below with the help of figures.

The present subject matter describes the system 102 for assigning a money sign to a user in real time on an interface. Initially, the system 102 receives a request to identify a money sign for the user through a selection of a user control on the interface of the system 102. In response to receiving the request to identify the money sign, the system renders a form on the interface for the user to fill. The form comprises of user fillable fields for receiving demographic information pertaining to the user. The demographic information may include but is not limited to a name of the user, an identity of the user, an email address of the user, location of the user, mother tongue, gender, ethnicity, occupation, date of birth and a contact number of the user. In one example, the user may use a desktop to access the interface of the system 102. In another example, the user may use a mobile device to access the interface of the system 102. It may be understood that the user may use multiple devices for accessing the interface.

In an embodiment, the system generates a customized set of questions based on the demographic information provided by the user. For example, the demographic information may indicate an age and an occupation of the user. The system generates a set of questions tailored according to the age range of the user. The set of questions may be a selected set of scenario-based questions where the scenarios are pertinent to the age and occupation of the user as can be inferred from the demographic information. For example, the user may be a student finishing higher education and in search for a job opportunity. In another example, the user may be a retired service man saving for his post retirement life. In yet another example, the user may be a sole bread earner of the family exploring financial investment options, and trying to analyse the money sign to make rational and practical financial decisions.

Upon receiving the request to identify the money sign from the user, the system 102 may render a set of questions on the interface for the user to answer. It may be understood that the set of questions is related to a set of facets relating to human personality. In one example, the set of questions may comprise descriptive questions. In another example, the set of questions may comprise multiple choice-based questions providing the user a choice to select any one option out of a set of four options. In yet another example, the set of questions may be scenario-based questions requiring the user to imagine a scenario and provide an answer to the question.

Further, the facet of the set of facets may be understood as a psychological, and a behavioural quality of a person. It may be understood that the facets identified from the key component of an answer denote a behavioural trait of the user. For instance, a positive attitude is a facet of a user which could be identified from a key component of the user's answer such as "hope" or "keep trying" or "learning from mistakes" etc. The behavioural trait denoted by the positive attitude is optimism. On the other hand, a negative thought, inadequacy, low self-esteem, etc. are facets of the user with a pessimistic behavioural trait.

Referring back to FIG. 1, the system 102 may receive a set of answers from the user through the user interface of the system. It may be understood that the set of answer may be received from the user in an audio format, a textual format, an image format, and a video format. Further, if the set of answer is received in the audio format, the image format and the video format the set of answer may be converted to a structured text format before extracting the key component from the set of answer.

Upon receiving the set of answers from the user, the system 102 extracts a key component from the set of answers received from the user to calculate a user score for each of the set of facets based on a machine learning model. The key component may be understood as an element of each of the answers in the set of answers which may be used by the system 102 for scoring in subsequent steps.

Furthermore, the machine learning model may be understood to a continuous learning model. For instance, the machine learning model may be fed with a test data of "n" number of users, the set of answers provided by the users, the key components identified for the set of answers, and the money sign assigned to the users. Particularly, the machine learning model may be taught to identify the key components from a long answer comprising of several words. Based on the test data set the machine learning model may create a database of the key components usually used in the answers by the user. In one example, the database of the key components may be corrected and regulated by a manual trainer. Eventually, the machine learning model may be trained to operate automatically without any manual intervention. Therefore, as a result of continuous learning, the machine learning model may precisely and accurately pick up the key components i.e. one or more words from the answers received from the users and use the key component for scoring by the system 102.

Referring to the example given in Table 1, the question may be "What is your pattern for asset class purchases in the last 5 years?" and the user may be given a set of options: Option (a), Option (b), Option (c), Option (d) and Option (e). As shown in Table 1, each of the options have a user score such as Option (a) has a score of 1, Option (b) has a score of 2, Option (c) has a score of 3, Option (d) has a score of 4 and Option (e) has a score of 5. In this example, if the user selects Option (a) which is "Kept my savings in the same asset class/classes" then the user score is 1 which indicates that the user has a low curiosity level.

In one example, the system 102 may ask a multiple choice-based questions to a user and the user may be provided more than one option like option a, b, c, d, and option e, to be selected as an answer. Further, each question may be connected to a facet and each option for answer in the multiple choice-based question may be further connected to a user score. The user score may be the score assigned by the deep learning algorithms and a scoring matrix to each answer of the set of answers received from the user as shown in following Table 1:

TABLE 1

| Sr. No. | Facet | Question | Options for answer by user | User Score | Inference |
|---|---|---|---|---|---|
| 1 | Curiosity | What is your pattern for asset class purchases in the last 5 years? | (a) Kept my savings in the same asset class/classes | 1 | Very disinterested/ indifferent |
| | | | (b) Explored a new asset class | 2 | |
| | | | (c) Explored multiple new asset classes | 3 | |
| | | | (d) Added multiple new asset classes | 4 | |
| | | | (e) Added multiple new asset classes but still exploring more options. | 5 | Very inquisitive/ investigative e |
| 2 | Curiosity | What is your approach toward financial products which are new to me? | (a) Largely ignore them | 1 | Very disinterested/ indifferent |
| | | | (b) Try to collect some information but don't investigate much | 2 | |
| | | | (c) Take active interest in new financial products | 3 | |
| | | | (d) Make investment decisions based on my research and knowledge | 4 | |
| | | | (e) Consult experts for more clarity on new financial products | 5 | |
| 3 | Creativity | What is a pattern of your last five years' income sources for my financial well-being? | (a) Focused largely on my current job/business | 1 | Very uninspired/ uncreative |
| | | | (b) Explored one additional source of income | 2 | |
| | | | (c) Explored multiple new sources of income | 3 | |
| | | | (d) Used my present skills to add at least one additional sources of income | 4 | |
| | | | (e) Learnt | 5 | Very |

TABLE 1-continued

| Sr. No. | Facet | Question | Options for answer by user | User Score | Inference |
|---|---|---|---|---|---|
| | | | new skills to diversify into additional sources of income | 5 | innovative/ imaginative |
| 4 | ... | ... | ... | ... | ... |
| n | Satisfaction | How frequent is your involvement | (a) Very often like every week | 1 | Very dissatisfied/ greedy/high spender |

TABLE 1-continued

| Sr. No. | Facet | Question | Options for answer by user | User Score | Inference |
|---|---|---|---|---|---|
| | | in high risk-taking activities for additional income? | (b) Often like every month | 2 | |
| | | | (c) Sometimes like every three to four months | 3 | |
| | | | (d) Rarely like only once in a year | 4 | |
| | | | (e) Completely avoid | 5 | Very content/ low spender |

In another aspect, the answer received from the user may be descriptive. For example, the question may be "What are your preferred investment options?" and the user may answer "I prefer a stable and a low-risk investment option like a fixed term deposit over a high-risk option such as a cryptocurrency". The system then parses the answer to identify key components (keywords) such as "low-risk" and "stable" which maybe indicative of the facets "curiosity level" and "risk appetite" of the user. The key component "low risk" and "stable" indicate that the user has a low curiosity level and a low-risk appetite. These key components may be associated with a user score in a mapping table. The mapping table is in the form of a scoring matrix which has a set of key words mapped against a question and the user score is assigned to each of the key words. Therefore, the system may use the scoring matrix to rate the facets on a scale of 1 to 5 with 1 as lowest and 5 as highest. In the given example, the user may score as low as "1" or "2" for the facets "curiosity" and "risk appetite."

Further, after the user score is calculated for each of the set of facets, it is compared against a facet score. The facet score may be understood as a predefined score assigned to each facet of the set of facets in a scoring matrix (See Table 2 and Table 3) for each of the money signs. Referring now to an example Scoring Matrix shown in Table 2.

For instance, "curiosity" maybe a facet in the set of facets. Further, for a money sign A the facet "curiosity" may be allocated a facet score of 1 in the scoring matrix whereas Money sign B maybe assigned a facet score of 5 for the same facet "curiosity" and so on.

Further, each of the facet of the set of facets may be assigned a facet score for each of the money sign of the set of money signs as mentioned below in Table 2:

TABLE 2

MONEY SIGN and FACET SCORING MATRIX

| Sr. no. | Facet | Money Sign A | Money Sign B | Money Sign C | Money Sign D | Money Sign E | Money Sign F | Money Sign G | Money Sign H |
|---|---|---|---|---|---|---|---|---|---|
| 1 | Curiosity | 1 | 5 | 2 | 1 | 4 | 2 | 3 | 5 |
| 2 | Creativity | 1 | 5 | 3 | 5 | 3 | 2 | 2 | 4 |
| 3 | Patience | 4 | 3 | 1 | 4 | 3 | 5 | 5 | 1 |
| 4 | Organization | 3 | 5 | 1 | 4 | 5 | 3 | 2 | 4 |
| 5 | Discipline | 4 | 4 | 1 | 5 | 3 | 5 | 2 | 3 |
| 6 | Hyper competition | 4 | 3 | 4 | 2 | 5 | 1 | 1 | 5 |
| 7 | Aggressiveness | 1 | 4 | 5 | 2 | 4 | 2 | 1 | 5 |
| 8 | Satisfaction | 4 | 3 | 1 | 5 | 2 | 4 | 5 | 1 |
| 9 | Anxiety | 5 | 2 | 1 | 4 | 3 | 5 | 1 | 2 |

It may be understood from above table 2 that a set of money sign may comprise eight (08) money signs and the money signs may be named as: money sign A, money sign B, money sign C, money sign D, money sign E, money sign F, money sign G, and money sign H. Further, each facet of the set of facets may be assigned a facet score on a scale of 1 to 5, and in terms of value, 1 may be understood as a lowest extreme and 5 may be understood as a highest extreme.

In one example, a matching logic may be implemented wherein a match score may be computed as a full score, a moderate score, and a minor score by the scoring matrix and the deep learning algorithms. The full score, the moderate score, and the minor score may be provided to each user score for each key component for each answer in the set of answers for each money sign using deep learning algorithms and the scoring matrix.

Referring to table 2, wherein a user is scored for money sign A first. If the key component corresponding to the 'curiosity' facet of the set of facets is given a user score as 1 by the scoring matrix, then the facet score 1 of money sign A for curiosity which is also 1 qualifies to be a 'full match'. In other words, the match score of the user suggests that the facet of 'curiosity' of the user score is corresponding to the facet score of the Money sign A. Similarly, the scores of all key components for the set of answers may be scored using deep learning algorithms and the scoring matrix.

Further, the match score may be generated for each money sign depending on whether the user score of the key component and the facet score of the money sign for the particular facet is same, or different. In one example, the full score, the moderate score and the minor score may be assigned as follows in Table 3:

TABLE 3

| Type of match | Condition | Match score |
|---|---|---|
| Full match | User Score of key component = Facet Score of the money sign for same facet | 1 |
| Moderate match | User Score of key component = (Facet Score of the money sign for same facet + 1); or User Score of key component = (Facet Score of the money sign for same facet − 1) | 0.5 |
| Minor match | User Score of key component = (Facet Score of the money sign for same facet + 2); or User Score of key component = (Facet Score of the money sign for same facet − 2) | 0.25 |

It may be understood from Table 3, that the match score may decrease with increase in difference of a user score for the key component, and the facet score of the money sign for same facet as assigned in the scoring matrix of the money sign.

Further, it may be pertinent to note that the match score as mentioned in Table 2, is fixed and devised for each of the money sign through a behavioural analysis, and a financial analysis for the test set of users. In one example the test set of users may comprise 200 users. In another example, the test set of users may comprise 400 users. In yet another example, the test set of users may comprise 1000 users.

In one example, the set of facets corresponding to the user for rendering the questions in system 102 are used for identifying a financial personality and a psychological profile of the user.

Further, a financial personality may comprise but not be limited to a spending habit of the user, an inclination towards savings, a savings pattern of the user, a financial preference of the user. It may be noted that the financial personality is an outcome of the behavioural traits and the set of facets of the individual relating to finance specifically.

Further, a psychological profile may include but is not limited to a patience level of the user, a curiosity, a risk appetite, a satisfaction level, a decisiveness, a creativity level, an intellectual capability, and an openness. In one example, an introvert user may be frugal in terms of spending money. In another example, an extrovert may be a spendthrift in terms of spending money. It may be understood that there exists a linkage between the psychological profile and the financial personality of the user. Therefore, the user with a given psychological profile and a particular financial personality may be predicted to be assigned to a particular money sign based on the set of facets, a facet score, the user score, and the match score.

Upon extracting the key component from the set of answers, the system 102 may score the key component based on a scoring matrix and deep learning algorithms to assign a user score to each answer of the set of answers. Examples of the deep learning algorithms include Convolutional Neural Networks (CNN), Recurrent Neural Networks (RNN), and Artificial Neural Networks (ANN). It may be understood that the deep learning algorithms may include a data set of questions, a dataset of answers, and a collection of key components for the data set of answers. Further, the data set of questions may comprise all possible questions for different topics, subtopics, subjects applicable for any user on the interface. The probable set of answers with the respective key components for each of the answer received for each question in the data set may be first determined by the deep learning algorithm and verified manually in initial stage. Furthermore, a new answer and a new key component received from the user may be added to the dataset of answers. Similarly, a scoring matrix, a dataset of facet scores, and a dataset of match scores corresponding to the collection of key components for the set of answers may be maintained. The system 102 may calculate the user score for the new key component of the new answer based on the deep learning algorithms, and the match scores of the key components for the data set of answers.

Further, the scoring may generate a facet score for a money sign of a set of predefined money signs. The predefined money may be understood to be based on the psychological profile and the financial personality of the user.

Finally, the system 102 may assign the money sign identified with a maximum match score to the user.

Further, a user profile corresponding to the money sign is extracted by the system 102 and assigned to the user. The user profile may be understood to be unique to the user. The user profile may comprise but not be limited to the demographic information of the user, the set of answers provided by the user, a time stamp for the set of answers, a financial status, an investment profile, and a profile picture of the user.

Furthermore, the system 102 may monitor the user profile for any change in a financial status, the demographic information of the user, and the money sign.

Further, the money sign of the user may be validated at a regular interval of a pre-determined period. The validation is dependent on any change in the financial status, and the demographic information of the user.

Each of the money signs is mapped to a unique set of personality traits and psychological preferences based on a behavioural analysis, and financial analysis of historic user records. The scoring matrix for each money sign of the set of money signs is distinctive and specific to each of the money sign, and the scoring matrix of each money sign is validated using a test data for a test set of users.

Further, the money sign is assigned to the user through artificial intelligence. It may be understood that the artificial intelligence may be based on deep learning algorithms. It may be noted that the deep learning algorithms include the CNN, the RNN, and the ANN.

In an embodiment, the system 102 may assign a money sign to a user in real time on the interface. It may be understood that the user is assigned the money sign when the user requests for identifying the money sign on the interface of the system. It may be pertinent to note that system 102 may devise a set of predefined money signs using the test data for the test set of users.

In one example, the system 102 may comprise a set of 08 money signs. In another example, the system 102 may comprise a set of 10 money signs. It may be understood that the system 102 may comprise more than one money sign at any given time in the set of money signs. In another example, the set of money signs may be analogous to a set of psychological profiles. In yet another example, the set of money signs may be analogous to a set of financial personality. It may be pertinent to note that each of the money sign of the set of money sign is distinctive from every other money sign of the set of money sign. In other words, no two money signs of the set of money sign may be identical at any given point of time.

In one example, a test data for a test set of 100 users may be studied for identifying a set of facets corresponding to each of the 100 users. For instance, the set of facets may comprise but not be limited to a decision-making ability, a level of curiosity, a problem-solving ability, a risk-taking ability, an innovative quotient, a patience level, a temperament, a rationality and the like. It may be understood that the set of facets corresponding to the user, directly or indirectly affect the user's financial decisions and financial mindset as well.

In one example, an Openness, Conscientious, Extraversion, Agreeableness, and Neuroticism (OCEAN) framework may be used for deciding the set of facets to be tested for the user. Further, the framework may comprise a set of behavioural traits, a behaviour extreme, a set of facets, a low scorer, and a high scorer. Furthermore, the set of facets for the OCEAN frame work may be considered as mentioned in Table 4 below:

TABLE 4

| Sr. no. | Set of behavioural traits | Behaviour extreme | Set of Facets | Low Scorer | High Scorer |
|---|---|---|---|---|---|
| 1 | Openness, Originality, Open-mindedness | Open vs. Closed to Experience | Ideas/intellect Imagination Creativity Curiosity | Down-to-earth Uncreative Conventional Uncurious | Imaginative Creative Original Curious |
| 2 | Conscientiousness, Control, Constraint | Conscientiousness vs. Impulsiveness | Deliberation Self-control Patience Self-discipline Dutifulness Order | Negligent Lazy Disorganized Late Erratic Unpredictable | Conscientious Hard-working Well-organized Punctual Consistent Predictable |
| 3 | Extraversion, Energy, Enthusiasm | Extraversion vs. Introversion | Sociability Assertiveness Boldness Vivacity Activity Positive emotions | Loner Quiet Passive Reserved | Joiner Talkative Active Affectionate |
| 4 | Agreeableness, Altruism, Affection | Agreeableness vs. Antagonism | Trust Affiliation Tendermindedness Cooperation Lack of aggression | Suspicious Critical Ruthless Irritable Aggressive Hostile Fight-starter | Trusting Lenient Soft-hearted Good-natured Affable Affectionate Affinitive |
| 5 | Neuroticism, Nervousness, Negative affectivity | Neuroticism vs. Emotional Stability | Trusting Lenient Soft-hearted Good-natured Affable Affectionate Affinitive | Calm Daring Even-tempered Comfortable Unemotional | Worried Fearful Temperamental Self-conscious Emotional |

In another example, the following set of facets may be used as mentioned in Table 5:

TABLE 5

| Sr. no. | Set of behavioural traits | Behaviour extreme | Set of Facets | Low Scorer | High Scorer |
|---|---|---|---|---|---|
| 1 | Openness, Originality, Open-mindedness | Open vs. Closed to Experience | Creativity Curiosity | Down-to-earth Uncreative Conventional Uncurious | Imaginative Creative Original Curious |
| 2 | Conscientiousne, | Conscientiousness | Patience | Negligent | Conscientious |

TABLE 5-continued

| Sr. no. | Set of behavioural traits | Behaviour extreme | Set of Facets | Low Scorer | High Scorer |
|---|---|---|---|---|---|
| | Control, Constraint | vs. Impulsiveness | Self-discipline Organizational Satisfaction | Lazy Disorganized Late Erratic Unpredictable | Hard-working Well-organized Punctual Consistent Predictable |
| 3 | Extraversion, Energy, Enthusiasm | Extraversion vs. Introversion | Hyper competition | Loner Quiet Passive Reserved | Joiner Talkative Active Affectionate |
| 4 | Agreeableness, Altruism, Affection | Agreeableness, Altruism, Affection | Aggressiveness | Suspicious Critical Ruthless Irritable Aggressive Hostile Fight-starter | Trusting Lenient Soft-hearted Good-natured Affable Affectionate Affinitive |
| 5 | Neuroticism, Nervousness, Negative affectivity | Neuroticism vs. Emotional Stability | Anxiety | Calm Daring Even-tempered Comfortable Unemotional | Worried Fearful Temperamental Self-conscious Emotional |

Consider an example, wherein a user named John desires to know his money sign in order to take some important financial decisions. Initially, John may access an interface of the system 102 on a laptop. Further, John may be prompted by the system to enter a demographic information. The demographic information may comprise but not be limited to a name of the user, an identity proof of the user, a username, an email address of the user, a location of the user, a date of birth and a contact number of the user. Therefore, John may enter the name as: John Andrews, submit a passport copy as the identity proof, create the user name as: John@123, provide the email address as john.andrews@123.com, select the location as New York, USA, enter the date of birth as 1 Jan. 1996, and the contact number as his 10 digit cell number. Further, John may request the system 102 to identify a money sign through a selection of a user control on the interface of the system 102. Further, the system 102 may render a set of questions to John. The set of questions may be related to the following set of facets: curiosity, creativity, patience, organization, discipline, hyper-competition, aggressiveness, satisfaction, and anxiety. Further, the set of questions may comprise the following questions:
1. How do you plan your investments?
2. Are you a salaried employee or a businessman?
3. What is your preferred way of investment?
4. Would you prefer investing in equity shares or cryptocurrencies or fixed term deposits?
5. Till what age do you plan to work?

Upon receiving the questions, John may answer the set of questions with a set of answers. Further, the system 102 may receive the set of answers on the interface. In next step, the system 102 may extract a key component from the set of answers received from the user. For instance, for question 3, if John answers that "I prefer to invest in the fixed term deposits over the cryptocurrencies and the equity shares", then John may be less creative and less curious as he is not willing to experiment with risky financial products. Further, the key component of the answer may mean that John prefers 'fixed' investments. Therefore, 'fixed' is a key component for the answer from John. In next step, the system 102 may score the key component 'fixed' investment based on a scoring matrix to obtain a user score. Similarly, key components for other four answers from John to the above set of questions comprising 05 questions may be extracted by the system 102. Furthermore, scoring of key components may be done on a scale of 1 to 5 using the scoring matrix, deep learning algorithms. It may be understood that the system 102 may match the user score with the facet score to generate a match score for a money sign of a set of predefined money sign. The predefined money sign may be based upon a psychological profile and a financial personality of John. For instance, there may be 08 money signs named as A, B, C, D, E, F, G, and H. Further, John's match score for A may be 5, for B may be 6, for C may be 9, for D may be 3, for E may be 5, for F may be 3, for G may be 2, and for H may be 6. Therefore, the money sign C may be identified as the money sign with a maximum match score for John according to a matching logic of the system 102. Accordingly, the system 102 may assign the money sign C to John. Further, a user profile may be created for John with the money sign C and the user profile may be unique to John. Further, the user profile of John may be monitored for any change in a financial status, the demographic information, and the money sign. It may be understood that the financial status of John is time dependent and thus the system 102 may validate the money sign of John at a regular interval of a predetermined period of 01 year at least. It may be understood that it is absolutely impossible for any human or a group of humans to perform all the above-mentioned steps in real time using natural intelligence.

Figure 2:
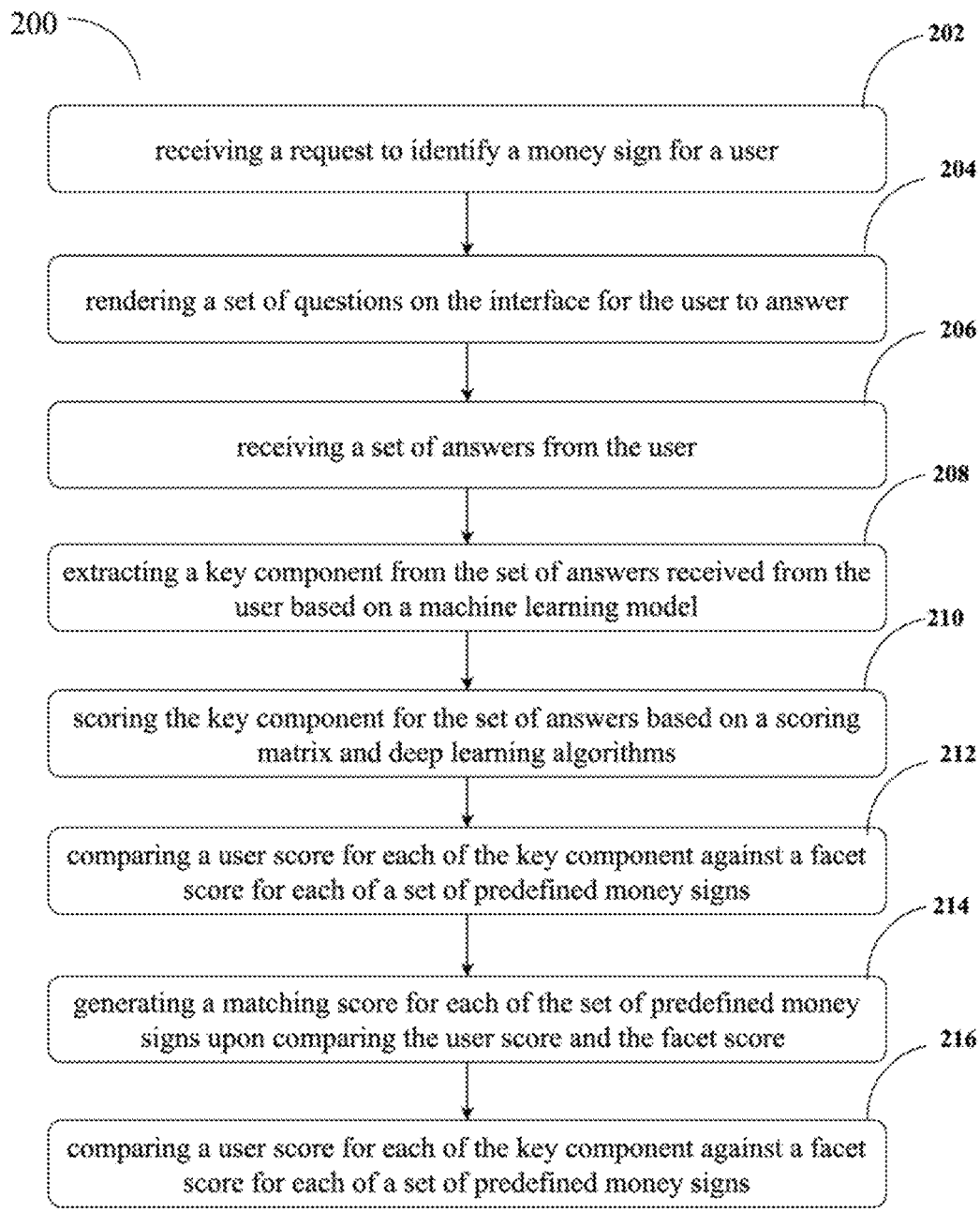
FIG. 2 illustrates a method for assigning a money sign to a user, in accordance with an embodiment of the present subject matter.

Referring now to FIG. 2, a method 200 for assigning a money sign to a user is shown, in accordance with an embodiment of the present subject matter. The method 200 may be described in the general context of computer executable instructions. Generally, computer executable instructions can include routines, programs, objects, components, data structures, procedures, modules, functions, etc., that perform particular functions or implement particular abstract data types.

The order in which the method 200 is described is not intended to be construed as a limitation, and any number of the described method blocks can be combined in any order to implement the method 200 or alternate methods for assigning a money sign to a user in real time. Additionally, individual blocks may be deleted from the method 200 without departing from the scope of the subject matter described herein. Furthermore, the method 200 for assigning the money sign to the user in real time on a platform can be implemented in any suitable hardware, software, firmware, or combination thereof. However, for ease of explanation, in the embodiments described below, the method 200 may be considered to be implemented in the above-described system 102.

At block 202, a request to identify a money sign may be received from a user. It may be understood that the request may be received through a selection of a user control and on an interface of a system.

At block 204, a set of questions may be rendered on the interface for the user to answer.

At block 206, a set of answers may be received from the user. The set of answers may be received on the interface of the system.

At block 208, a key component may be extracted from the set of answers received from the user based on a machine learning model. The key components may be correlated to a set of facets.

At block 210, the key component may be scored for each of the set of answers based on a scoring matrix and deep learning algorithms.

At block 212, a user score for each of the key component may be compared against a facet score for each of a set of predefined money signs. The predefined money sign represents a certain psychological profile, and a financial personality.

At block 214, a match score may be generated for each of the set of predefined money signs upon comparing the user score and the facet score.

At block 216, the money sign identified with a maximum match score may be assigned to the user.

Figure 3:
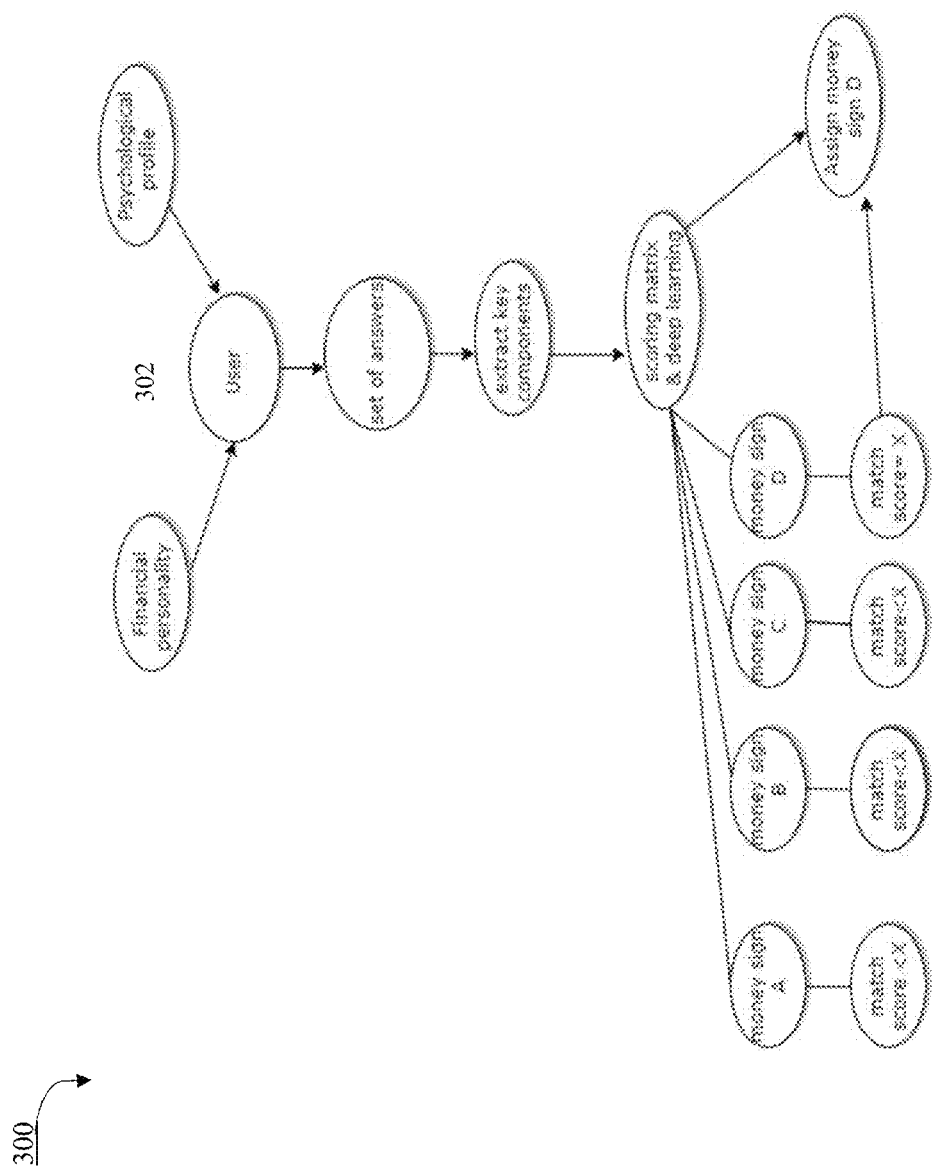
FIG. 3 illustrates an exemplary embodiment of the present invention for assigning a money sign to a user.

FIG. 3 illustrates an exemplary embodiment 300 of the present invention for assigning a money sign to a user 302 through a system 102. Initially, a request to identify a money sign for the user 302 may be received on the interface of the system 102. Further, the user 302 may be asked to provide a demographic information. The demographic information may comprise but not be limited to a name, an email address, a date of birth, and the like.

In next step the system 102 may render a set of questions to the user 302 wherein the set of questions may be related to a set of facets. For instance, the set of facets may include a patience level, a curiosity level, a learning aptitude, a satisfaction level and so on. Further, the system 102 may receive a set of answers from the user 302. The user 302 may provide the set of answers in a textual format using the interface on a laptop. Further, the system 102 may extract a key component from the set of answers received from the user 302 using a machine learning model. The key component may be understood to be correlated to the set of facets and the key components may be extracted for each answer of the set of answers.

In next step, the system 102 may score the key component for the set of answers based on a scoring matrix and deep learning algorithms to obtain a user score for each of the key component. Furthermore, the system 102 may compare the user score for each of the key component against a facet score for each of a set of predefined money signs. The predefined money sign represents a certain psychological profile and a financial personality.

It may be understood that the scoring may generate a match score for a money sign of a set of predefined money signs comprising money sign A, money sign B, money sign C, and money sign D. The predefined money sign is based upon a psychological profile, and a financial personality of the user 302. As a result of scoring, the maximum match score for money sign D may be calculated as 'X'. Further, the maximum match score for money signs A, B, and C may be less than (<) the value of X. Therefore, the money sign D may be identified by the system 102 as the money sign with a maximum match score. Finally, the system 102 may assign the money sign D to the user 302.

Figure 4:
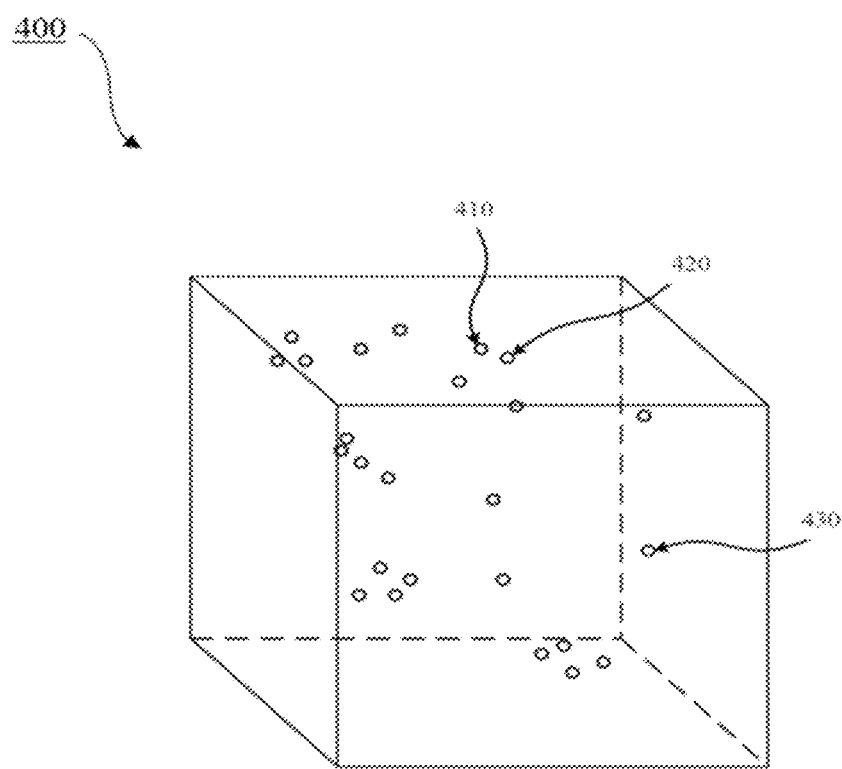
FIG. 4 illustrates an exemplary view of an embedding space in accordance with the present invention.

FIG. 4 illustrates an example view of a vector space 400. In particular embodiments, an object or an n-gram may be represented in a d-dimensional vector space, where d denotes any suitable number of dimensions. Although the vector space 400 is illustrated as a three-dimensional space, this is for illustrative purposes only, as the vector space 400 may be of any suitable dimension.

In particular embodiments, an n-gram may be represented in the vector space 400 as a vector referred to as a term embedding. Each vector may comprise coordinates corresponding to a particular point in the vector space 400 (i.e., the terminal point of the vector). As an example and not by way of limitation, vectors 410, 420, and 430 may be represented as points in the vector space 400, as illustrated in FIG. 4.

As an example and not by way of limitation, a dictionary trained to map text to a vector representation may be utilized, or such a dictionary may be itself generated via training. As another example and not by way of limitation, a model, such as Word2vec, may be used to map an n-gram to a vector representation in the vector space 400. In particular embodiments, an n-gram may be mapped to a vector representation in the vector space 400 by using a machine leaning model (e.g., a neural network). The machine learning model may have been trained using a sequence of training data (e.g., a corpus of objects each comprising n-grams).

In particular embodiments, an object may be represented in the vector space 400 as a vector referred to as a feature vector or an object embedding. In particular embodiments, an object may be mapped to a vector based on one or more properties, attributes, or features of the object, relationships of the object with other objects, or any other suitable information associated with the object.

As an example and not by way of limitation, an object comprising a video or an image may be mapped to a vector by using an algorithm to assign a money sign to a user. Features used to calculate the vector maybe based on information obtained from edge detection, corner detection, blob detection, ridge detection, scale-invariant feature transformation, edge direction, changing intensity, autocorrelation, motion detection, optical flow, thresholding, blob extraction, template matching, Hough transformation (e.g., lines, circles, ellipses, arbitrary shapes), or any other suitable information.

As another example and not by way of limitation, an object comprising audio data may be mapped to a vector based on features such as a spectral slope, a tonality coefficient, an audio spectrum centroid, an audio spectrum envelope, a Mel-frequency cepstrum, or any other suitable information. Although this disclosure describes representing an n-gram or an object in a vector space in a particular manner, this disclosure contemplates representing an n-gram or an object in a vector space in any suitable manner.

In particular embodiments, the system 102 may calculate a similarity metric of vectors in vector space 400. The similarity metric may be a cosine similarity, a Minkowski distance, a Mahalanobis distance, a Jaccard similarity coefficient, or any suitable similarity metric. The similarity metric of two vectors may represent how similar the two objects or n-grams corresponding to the two vectors, respectively, are to one another, as measured by the distance between the two vectors in the vector space 400. As an example and not by way of limitation, vector 410 and vector 420 may correspond to objects that are more similar to one another than the objects corresponding to vector 410 and vector 430, based on the distance between the respective vectors. Although this disclosure describes calculating a similarity metric between vectors in a particular manner, this disclosure contemplates calculating a similarity metric between vectors in any suitable manner.

Figure 5:
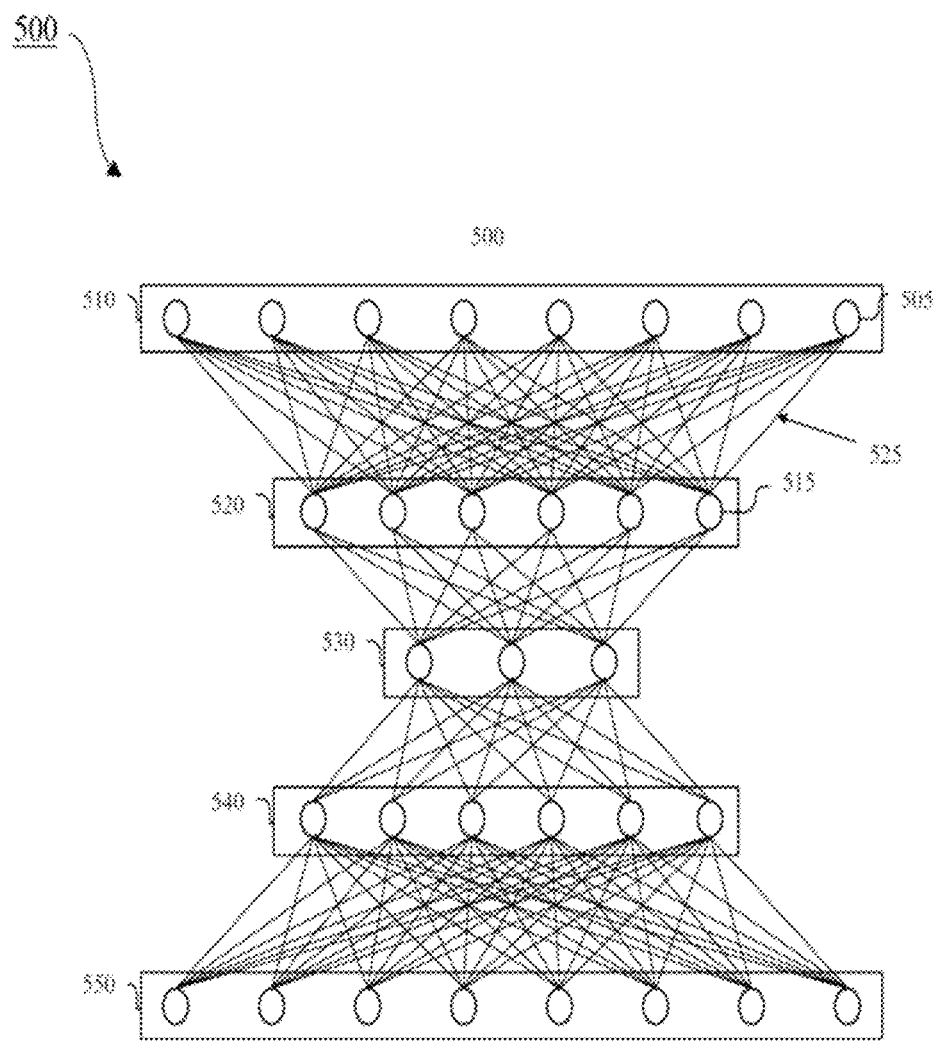
FIG. 5 illustrates an exemplary artificial neural network in accordance with the present invention.

Referring now to FIG. 5 illustrating an example artificial neural network ("ANN")500 of the deep learning algorithms. In particular embodiments, an ANN may refer to a computational model comprising one or more nodes. Example ANN 500 may comprise an input layer 510, hidden layers 520, 530, 560, and an output layer 550. Each layer of the ANN 500 may comprise one or more nodes, such as a node 505 or a node 515. In particular embodiments, each node of an ANN may be connected to another node of the ANN. As an example and not by way of limitation, each node of the input layer 510 may be connected to one of more nodes of the hidden layer 520.

In particular embodiments, one or more nodes may be a bias node (e.g., a node in a layer that is not connected to and does not receive input from any node in a previous layer). In particular embodiments, each node in each layer may be connected to one or more nodes of a previous or subsequent layer. Although FIG. 5 depicts a particular ANN with a particular number of layers, a particular number of nodes, and particular connections between nodes, this disclosure contemplates any suitable ANN with any suitable number of layers, any suitable number of nodes, and any suitable connections between nodes. As an example and not by way of limitation, although FIG. 5 depicts a connection between each node of the input layer 510 and each node of the hidden layer 520, one or more nodes of the input layer 510 may not be connected to one or more nodes of the hidden layer 520.

In particular embodiments, an ANN may be a feedforward ANN (e.g., an ANN with no cycles or loops where communication between nodes flows in one direction beginning with the input layer and proceeding to successive layers). As an example and not by way of limitation, the input to each node of the hidden layer 520 may comprise the output of one or more nodes of the input layer 510. As another example and not by way of limitation, the input to each node of the output layer 550 may comprise the output of one or more nodes of the hidden layer 560. In particular embodiments, the ANN may be a deep neural network (e.g., a neural network comprising at least two hidden layers). In particular embodiments, the ANN may be a deep residual network. A deep residual network may be a feedforward ANN comprising hidden layers organized into residual blocks. The input into each residual block after the first residual block may be a function of the output of the previous residual block and the input of the previous residual block. As an example and not by way of limitation, the input into residual block N may be F(x)+x, where F(x) may be the output of residual block N−1, x may be the input into residual block N−1. Although this disclosure describes a particular ANN, this disclosure contemplates any suitable ANN.

In particular embodiments, an activation function may correspond to each node of an ANN. An activation function of a node may define the output of a node for a given input. In particular embodiments, an input to a node may comprise a set of inputs. As an example and not by way of limitation, an activation function may be an identity function, a binary step function, a logistic function, or any other suitable function.

In particular embodiments, the input of an activation function corresponding to a node may be weighted. Each node may generate output using a corresponding activation function based on weighted inputs. In particular embodiments, each connection between nodes may be associated with a weight. As an example and not by way of limitation, a connection 525 between the node 505 and the node 515 may have a weighting coefficient of 0.4, which may indicate that 0.4 multiplied by the output of the node 505 is used as an input to the node 515. In particular embodiments, the input to nodes of the input layer may be based on a vector representing an object. Although this disclosure describes particular inputs to and outputs of nodes, this disclosure contemplates any suitable inputs to and outputs of nodes. Moreover, although this disclosure may describe particular connections and weights between nodes, this disclosure contemplates any suitable connections and weights between nodes.

In particular embodiments, the ANN may be trained using training data. As an example and not by way of limitation, training data may comprise inputs to the ANN 500 and an expected output. As another example and not by way of limitation, training data may comprise vectors each representing a training object and an expected label for each training object. In particular embodiments, training the ANN may comprise modifying the weights associated with the connections between nodes of the ANN by optimizing an objective function.

As an example, and not by way of limitation, a training method may be used (e.g., the conjugate gradient method, the gradient descent method, the stochastic gradient descent) to backpropagate the sum-of-squares error measured as a distances between each vector representing a training object (e.g., using a cost function that minimizes the sum-of-squares error). In particular embodiments, the ANN may be trained using a dropout technique. As an example, and not by way of limitation, one or more nodes may be temporarily omitted (e.g., receive no input and generate no output) while training. For each training object, one or more nodes of the ANN may have some probability of being omitted. The nodes that are omitted for a particular training object may be different than the nodes omitted for other training objects (e.g., the nodes may be temporarily omitted on an object-by-object basis). Although this disclosure describes training the ANN in a particular manner, this disclosure contemplates training the ANN in any suitable manner.

Figure 6:
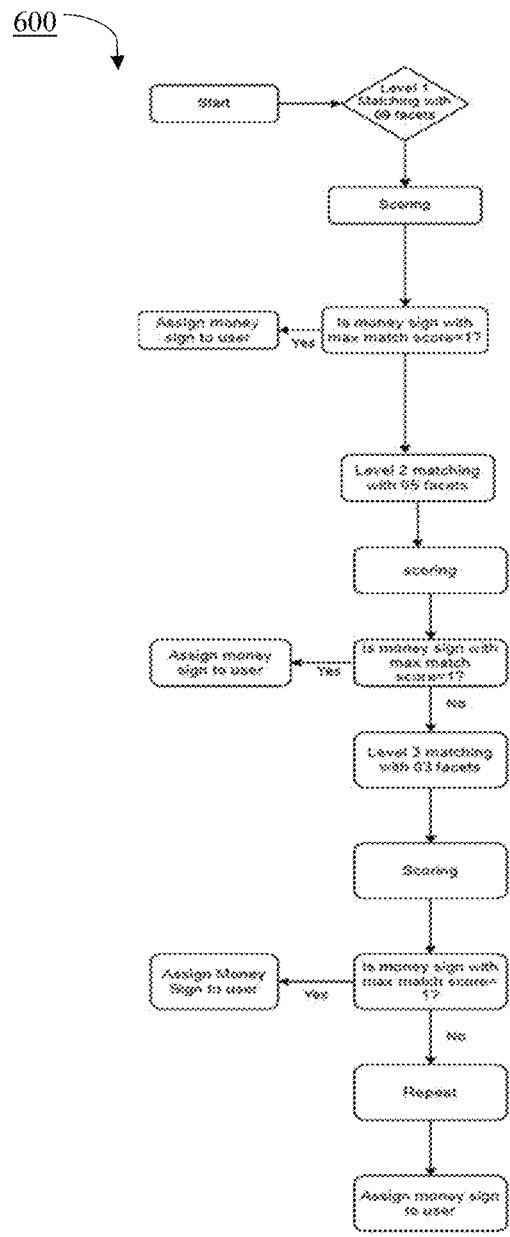
FIG. 6 illustrates an exemplary embodiment of the present invention for assigning a money sign to a user.

Referring now to FIG. 6, illustrating an exemplary embodiment 600 of the present invention for assigning a money sign to a user 602 through a system 102. It may be understood that the system 102 may comprise a matching logic for scoring the answers provided by the user using a multiple layer approach. In the matching logic with a multiple layer approach, initially all answers of the set of answers provided by the user for each facet of the set of facets may be considered for scoring at a level 1 as described in previous paragraphs of the present disclosure. In one example, the total number of facets in the set of facets maybe 9. Further, after scoring, it may be observed that at least two money signs are identified for the user with almost equal maximum match score with a tolerance level. The tolerance level may be understood as a difference between the maximum match scores of both money signs identified. For instance, a first maximum match score for the money sign B may be 5.50 and a second maximum match score for the money sign E maybe 5.25. Therefore, the tolerance level may be the difference between 5.50 and 5.25, i.e. 5.50–5.25=0.25. Further, to identify one money sign out of the money sign B and the money sign E, the system 102 may employ the matching logic for scoring at a level 2. It may be understood that at the level 2, the set of facets to be considered for scoring are reduced. In one example, if the total facets in the set of facets is 09 at the level 1, then the set of facets considered at the level 2 may be 5. Further, the scoring may be repeated for answers received for questions relating to only the 05 facets out of the total 09 facets. It may be understood that one question of the set of questions relates to one facet only. Accordingly, a new maximum match score may be generated for the money sign B and the money sign E. For instance, the first maximum match score for the money sign B may be 3 and the second maximum match score for the money sign E may be 2. Therefore, the money sign B may be identified as the money sign with the maximum match score and assigned by the system 102 to the user. Further, if the maximum match score at level 2 is also similar with the tolerance level of 0.25 or less than 0.25 then a level 3 matching logic may be used by the system 102. It may be understood that at the level 3 the number of facets considered for scoring may further decrease from 05 facets of the level 2 to 03 facets in the level 3. It may be understood that at the level 3 only the answers provided to the questions related to the 03 facets are scored to generate a maximum match score. Similarly, the matching logic may repeat scoring until the maximum match score for only one money sign is identified and the tolerance level is more than 0.25.

Figures 7A, 7B:
FIG. 7A illustrates an exemplary embodiment of the present invention for assigning a money sign to a user.
FIG. 7B illustrates an exemplary embodiment of the present invention for assigning a money sign to a user.

Referring now to FIG. 7A and FIG. 7B, illustrating an exemplary embodiment 700 of the present invention for assigning a money sign to a user. It may be understood that 09 set of facets may be considered for assigning the money sign to the user. Further, the money sign A, B, C, D, E, F, G, and money sign H may be assigned facet scores as shown in the facet scoring matrix. Further, a set of questions may be sent to the user through the interface of the system 102. Furthermore, the user may provide a set of answers to the set of questions. In next step, a key component may be extracted by a machine learning model of the system 102 from each answer of the set of answers provided by the user to obtain a user score for each of the answer. In next step, the system 102 may match the user score with the facet score for all money signs A to H. For a full match between the user score and the facet score a match score of 1.00 may be computed. Further for a moderate match between the user score and the facet score with a difference of 1, a match score of 0.50 may be computed. Furthermore, for a minor match between the user score and the facet score with a difference of 2, a match score of 0.25 may be computed. Accordingly, the deep learning algorithms and the scoring matrix may score each of the user score, as per matching with the facet score of all money signs and form a match scoring matrix. The match scoring matrix as shown in FIG. 7 B, may denote a maximum match score (in the last row) for each money sign A to H. It may be understood that the maximum match score may be calculate for money sign B as 5.50. Further, the maximum match score for money sign E may be calculated as 5.25, for money sign A as 5.00 and so on. Therefore, finally the system 102 may assign money sign B to the user.

Exemplary embodiments discussed above may provide certain advantages. Though not required to practice aspects of the disclosure, these advantages may include those provided by the following features.

Some embodiments of the system and the method promote effective and focused financial decision-making for individual investors.

Some embodiments of the system and the method enable the individual users to understand own set of facets better to further simplify financial planning.

Some embodiments of the system and the method help the users to identify their money sign in real time.

Some embodiments of the system and the method enable the user to take unbiased, accurate and well-informed financial decisions.

Some embodiments of the system and the method enable continuous learning of the model in order to assign the user in a most related and most matching money sign.

Although implementations for methods and system for assigning a money sign to a user have been described in language specific to structural features and/or methods, it is to be understood that the appended claims are not necessarily limited to the specific features or methods described. Rather, the specific features and methods are disclosed as examples of implementations for assigning a money sign to a user.

The invention claimed is:

1. A method implemented by a system for assigning a money sign to a user, the method comprising:
   receiving, by a processor, a request to identify a money sign for a user through a selection of a user control on an interface of a system;
   rendering, by the processor, a set of questions on the interface for the user to answer;
   receiving, by the processor, a set of answers from the user, wherein the set of answers is received on the interface;
   extracting, by the processor, a key component for each of the set of answers received from the user based on a machine learning model, wherein the key component is correlated to a set of facets;
   scoring, by the processor, the key component for each of the set of answers based on a scoring matrix and deep learning algorithms;
   comparing, by the processor, a user score for each of the key component against a facet score for each of a set of predefined money signs, wherein the predefined money sign represents a certain psychological profile, and a financial personality;
   generating, by the processor, a match score for each of the set of predefined money signs upon comparing the user score and the facet score; and
   assigning, by the processor, the money sign identified with a maximum match score to the user.

2. The method as claimed in claim 1, further comprising:
   creating, by the processor, a user profile based on the money sign with the maximum match score, wherein the user profile is unique to the user;
   monitoring, by the processor, the user profile for any change in a financial status, a demographic information of the user; and
   validating, by the processor, the money sign of the user at predetermined time intervals where in the validation is dependent on any change in the financial status, and the demographic information of the user.

3. The method as claimed in claim 1, wherein when the maximum match score is same for more than one money sign, the scoring is repeated by the deep learning algorithms until a single money sign is identified with the maximum match score.

4. The method as claimed in claim 1, wherein the set of money signs is devised using a historic data, a behavioral analysis, and a financial analysis, and wherein the scoring matrix for each money sign is distinctive and specific to each of the set of money signs, and wherein the scoring matrix of each money sign is validated using a test data for a test set of users.

5. The method as claimed in claim 1, wherein the set of answers is received from the user in an audio format, a textual format, an image format, and a video format, and wherein the audio format, the image format, and the video format are converted to a structured data format before extracting the key component from the set of answers.

6. A system for assigning a money sign to a user, the system comprimising: a memory; and
a processor coupled to the memory, wherein the processor is configured to execute program instructions stored in the memory for:
receiving a request to identify a money sign for a user through a selection of a user control on an interface;
rendering a set of questions on the interface for the user to answer;
receiving a set of answers from the user, wherein the set of answers is received on the interface;
extracting a key component for each of the set of answers received from the user based on a machine learning model, wherein the key component is correlated to a set of facets;
scoring the key component for each of the set of answers based on a scoring matrix and deep learning algorithms;
comparing a user score for each of the key component against a facet score for each of a set of predefined money signs, wherein the predefined money sign represents a certain psychological profile, and a financial personality;
generating a match score for each of the set of predefined money signs upon comparing the user score and the facet score; and
assigning the money sign identified with a maximum match score to the user.

7. The system as claimed in claim 6, further comprising:
creating a user profile based on the money sign with the maximum match score, wherein the user profile is unique to the user;
monitoring the user profile for any change in a financial status, a demographic information of the user; and
validating the money sign of the user at predetermined time intervals wherein the validation is dependent on any change in the financial status, and the demographic information of the user.

8. The system as claimed in claim 6, wherein the set of money sign is devised using a historic data, a behavioral analysis, and a financial analysis, and wherein the scoring matrix for each money sign is distinctive and specific to each of the money sign, and wherein the score matrix of each money sign is validated using a test data for a test set of users.

9. The system as claimed in claim 6, wherein the set of answer received from the user in an audio format, a textual format, an image format, and a video format, and wherein the audio format, the image format, and the video format are converted to a structured data format before extracting the key component from the set of answer.

10. A non-transitory computer program product having embodied thereon a computer program for assigning a money sign to a user, the computer program product storing instructions, the instructions comprising instructions for:
receiving a request to identify a money sign for a user through a selection of a user control on an interface;
rendering a set of questions on the interface for the user to answer;
receiving a set of answers from the user, wherein the set of answers is received on the interface;
extracting a key component for each of the set of answers received from the user based on a machine learning model, wherein the key component is correlated to a set of facets;
scoring the key component for each of the set of answers based on a scoring matrix and deep learning algorithms;
comparing a user score for each of the key component against a facet score for each of a set of predefined money signs, wherein the predefined money sign represents a certain psychological profile, and a financial personality;
generating a match score for each of the set of predefined money signs upon comparing the user score and the facet score; and
assigning the money sign identified with a maximum match score to the user.

* * * * *